Nov. 19, 1957 G. G. JORIS 2,813,858
PROCESS FOR PURIFYING EPSILON-CAPROLACTAM
Filed Aug. 26, 1954
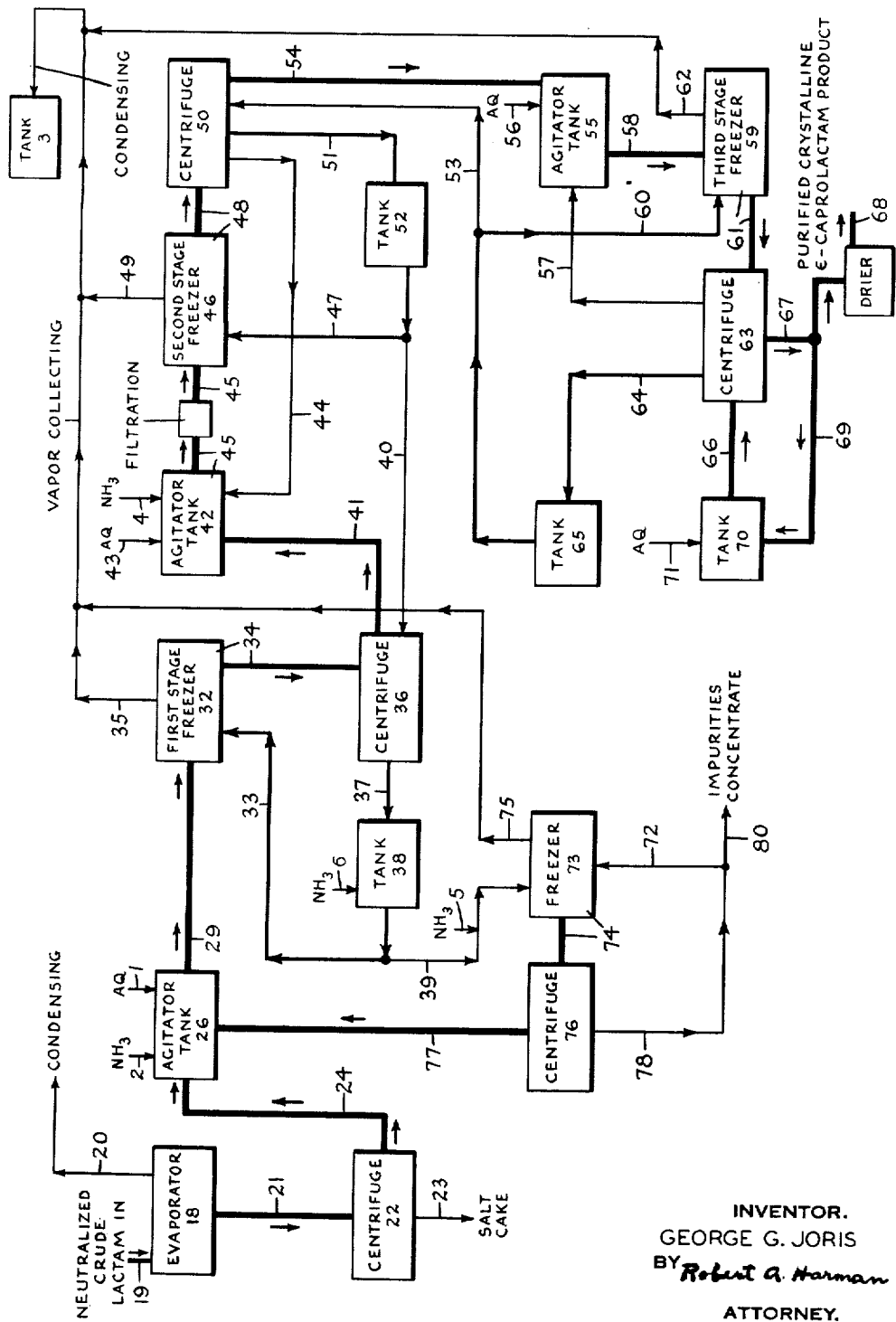
INVENTOR.
GEORGE G. JORIS
BY Robert G. Harman
ATTORNEY.

United States Patent Office 2,813,858
Patented Nov. 19, 1957

2,813,858
PROCESS FOR PURIFYING EPSILON-CAPROLACTAM

George G. Joris, Madison, N. J., assignor to Allied Chemical & Dye Corporation, New York, N. Y., a corporation of New York Application August 26, 1954, Serial No. 452,429

9 Claims. (Cl. 260—239.3)

This invention relates to epsilon-caprolactam and more specifically to a process for highly purifying this substance. The terms "caprolactam" and "lactam" are used herein for brevity to mean epsilon-caprolactam.

Lactam can be polymerized for manufacture into useful products such as filaments, films, molding powders, etc. In order to have maximum usefulness the lactam monomer should be virtually free of contaminants. Purification to desired high standards has presented a problem in the art because of inherent properties of caprolactam, including especially its broad solvent power whereby a wide variety of substances will remain persistently with the lactam through purification treatments including distillation.

There are various criteria, such as visual color, melting point, iron content, alkalinity, ability of aqueous solutions of lactam to transmit light, and amount of oxidizable impurities, for judging the quality of lactam. Exemplary of present exacting commercial standards for high quality lactam are those based on transmission of light through lactam solutions, and on amount of oxidizable impurities in the lactam.

Specifically, the "color" test can be cited: the intensity of light transmitted through 100 ml. of a solution of four parts by weight of lactam in five parts by weight water in a tall form Nessler tube should be at least equal to that correspondingly transmitted through 100 ml. of a standard, e. g. a number 50, platinum-cobalt water color standard solution of the American Public Health Association (A. P. H. A.). Details of making up suitable A. P. H. A. testing solutions can be found at pages 14 and 15 of Standard Methods for Examination of Water and Sewage, 9th Ed., 4th printing (1951), American Public Health Association, 1790 Broadway, New York 19, New York. For convenience the result of the test is sometimes termed "color." The lactam is said to have a certain number of "A. P. H. A. units," that is light transmission characteristics equivalent to the correspondingly-numbered A. P. H. A. test solution. The term "A. P. H. A. units" as used herein will be understood accordingly to have resulted by use of such test. Lower numbers (under 30) correspond to increasingly pure samples.

Oxidizable impurities in lactam can be measured by the length of time required for reaction between an aqueous lactam sample solution, and a dilute oxidizing agent, e. g. potassium permanganate. Specifically, the pink coloration of 100 ml. of a water solution containing 0.1 grams of lactam to which 0.2 ml. of 0.01 N potassium permanganate has been added will remain discernible to the eye for a certain time. This time is referred to as the "permanganate number" and/or "permanganate time" of the lactam. The time required for oxidation of the sample by permanganate can be determined using light-sensitive instruments to follow the oxidation instead of using the unaided eye. For example a colorimeter can be used to record the intensity of yellow coloration imparted to the sample solution by permanganate oxidation products, as the added potassium permanganate becomes oxidized by the sample solution. The time to reach a tsandard yellow intensity can be used to give the permanganate number. A desirable minimum permanganate number is 250 seconds. Lactam products recovered from reaction mixtures contain organic contaminants present in minor but objectionable quantities. These contaminants can vary in kind and in amount depending upon the method used for making the lactam and upon operating variables even when the same method is used.

One well known method for preparing epsilon-caprolactam is the Beckmann rearrangement of cyclohexanone oxime with 100% sulfuric acid, the lactam being recovered by neutralizing the reaction mixture with an aqueous base, withdrawing the resulting aqueous lactam layer from the aqueous salt layer, and distilling off first the water and then the lactam; or by extracting the neutralized reaction mixture with solvent and distilling off all the solvent. Other methods such as hydration of adipodinitrile and reduction combined with rearrangement of nitrocyclohexane can also be used to prepare reaction mixtures from which lactam is recoverable, e. g. by distillation. A typical lactam product made by the Beckmann rearrangement will contain before distillation per 100 parts by weight of lactam about 1 part of inorganic sulfate and at least about ½ part by weight total of objectionable organic contaminants which are believed to include octahydrophenazine; unreacted cyclohexanone and/or its oxime; hydrolysis products of the lactam; and sulfonation products of the oxime and lactam.

Various methods of final purification of caprolactam have been tried. On the commercial scale it has been the practice to purify lactam by operations concluding with fractional distillation of the lactam under reduced pressure in one or more stages. One such operation is described at pages 603–604 of German Synthetic Fiber Developments (1946), published by the Textile Research Institute, New York, New York.

High quality lactam meeting purity standards such as those described above can be made by such distillation operations, but at least under commercial conditions the distillation gives uneconomical rates of output. Apparently contamination of lactam readily occurs during its distillation via thermal decomposition of heat-sensitive impurities. For this reason and because like-boiling impurities are present in commercial lactam, the proportion of lactam meeting high purity standards, obtained in commercial operations, is small compared to the total amount of lactam charged to the operation, whence the uneconomical rates of output.

Among advantages of the present invention are that the final epsilon-caprolactam obtained is of exceptionally high quality, and the process operates at economical rates under operating conditions which can readily be maintained in commercial scale installations.

I have discovered that the broad solvent powers of lactam can be utilized for its own self-purification, under conditions selected in accordance with my invention. My process comprises partially freezing molten epsilon-caprolactam containing dissolved therein at least 0.1 gram mol of purifier per 1000 grams of epsilon-caprolactam into a slush of crystalline lactam and lactam-rich melt, said melt having purifier concentration not in excess of 30 molal with respect to the epsilon-caprolactam therein; and separating crystalline lactam from said melt.

By the "molal" concentration of purifier in the melt I mean gram mols of dissolved purifying substance therein per 1000 grams of molten lactam.

The accompanying drawing is a flow sheet showing a preferred multistage cyclic method of practicing my invention. It will be described in detail in connection with Example 4 appearing hereinafter.

The "purifier" used in my process can be any material or mixture of materials soluble in molten epsilon-caprolactam. This material can be added to the impure lactam product being charged into my process, or it can be introduced into the process at least in part as a component of an impure lactam feed.

Materials soluble in molten lactam can be grouped in several classes in accordance with their physical properties and their solubility behavior. One such class is solids soluble in molten lactam. By "solids" in this connection I mean a material which is crystalline at normal atmospheric temperatures and up to at least 40° C., e. g. cyclohexanone oxime. Another class is liquids soluble in molten lactam, these being materials or mixtures of materials which are liquid at 40° C. and normal atmospheric pressure. The liquids are preferred as assuring a satisfactorily wide range of operating temperatures between the melting point of pure lactam (about 68° C.) and the solidification temperature of the lactam melt containing the purifier (the eutectic temperature of the mixture).

The preferred purifiers moreover are volatile, that is, they have vapor pressures of at least 25 mm. Hg at the melting point of pure caprolactam, i. e. at about 68° C. Volatile purifiers suitable for use in my process include water, ammonia, carbon tetrachloride, benzene, chloroform, ethyl chloride, acetone, cyclohexanone, cyclohexane, paraffinic and aromatic hydrocarbons, alcohols such as ethanol and methanol, etc. Volatile purifiers can be substantially completely removed from lactam crystals by evaporation at temperature below the lactam melting point using conventional drying equipment. Among volatile purifiers, those with relatively low molecular weights, not above 50, are preferred for reasons discussed in detail below.

Materials having vapor pressure less than about 25 mm. Hg at temperature of 65° C., e. g. high-boilers such as ethylene glycol or n-octanol, can be used as purifiers for my process whenever small amounts thereof will be innocuous in the final lactam. It is possible to utilize organic contaminants present in a particular lactam product for part of all of the necessary purifier. In such operation, if desired, one can displace contaminated lactam-rich melt from the purified crystals with a volatile material, e. g. by rinsing.

Lactam-soluble substances for use as purifiers in my process can be grouped according to the vapor pressures of their solutions in molten lactam. The preferred substances are those which, when added in progressively higher concentrations to molten caprolactam, give solutions with vapor pressures not substantially higher than those calculated for an ideal solution, i. e. give solutions showing only negative deviations from Raoult's law. When lactam solvent has been partially frozen out of these solutions the melt remains reasonably stable, at the resulting temperature and concentration of purifier, toward change in relative concentrations of lactam and purifier with temperature changes; i. e. the molal depression of the freezing point in these melts is relatively high.

The importance of this high molal freezing point depression can be appreciated by consideration of the behavior of water as the purifier. In the following table are shown freezing points of lactam melts (i. e. temperatures at which solid lactam first forms therein) versus molality of water (mols of water per 1000 grams of lactam in melt). Weight percent composition of the melts is also shown.

| Freezing Point, degrees C | Molality | Weight Percent in Melt | | DM[1] | DF,[2] degrees | Ratio, DF/DM |
|---|---|---|---|---|---|---|
| | | Water | Lactam | | | |
| 68 | 0 | 0 | 100 | | | |
| 60.1 | 1.37 | 2.4 | 97.6 | 1.37 | 7.9 | 5.75 |
| 52.5 | 2.80 | 4.8 | 95.2 | 1.43 | 7.6 | 5.3 |
| 46.0 | 4.18 | 7.0 | 93.0 | 1.38 | 6.5 | 4.7 |
| 40.1 | 5.57 | 9.1 | 90.9 | 1.39 | 5.9 | 4.25 |
| 29.7 | 8.31 | 13.0 | 87.0 | 2.74 | 10.4 | 3.8 |
| | | | | [3] 8.31 | [3] 38.3 | [3] 4.6 |

[1] Change in molality of water from a given value in column 2 to the next above it.
[2] Change in freezing point from a given value in column 1 to the next above it.
[3] Overall.

It will be appreciated that the approximately 5-fold change in weight percent water of the table, from 2.4% to 13%, corresponds to partially freezing 1000 parts of a lactam melt originally containing 976 parts of lactam and 24 parts of water until the molten lactam remaining amounts to only 185 parts, the water in the melt remaining at 24 parts. Accordingly in freezing such a lactam melt to such extent, about 83% of the original molten lactam is converted to solid lactam in the resulting slush.

A slurry of solids content above 80% is difficult to handle compared to one with lower solids. Accordingly it will be appreciated that relatively high values such as shown in the last column of the table for ratios of changes in freezing point to changes in molality, i. e. for molal depression of freezing point are desirable to allow a sufficient range of operating temperatures at desired solids content of slush and avoid solvent occlusion and other difficulties which might otherwise result from the normal variations appearing in operating temperatures. In preferred operations in accordance with my invention, purifiers and purifier concentrations are chosen to maintain the solids content of the slurry at least at 20% by weight, preferably 30%–60%; and to maintain overall value for the DF/DM ratio at least about 2, preferably 4 and above.

The table shows weight percent composition of the melt as well as molality. With purifiers having a relatively low molecular weight, such as water, ammonia, methanol, and ethanol a given molality is obtained at relatively small weight percent concentration of purifier.

Freezing point depression is roughly proportional to molality. In melts which follow Raoult's Law, the depression is less than proportional to molality; but the depression becomes greater as the melts show greater negative deviations from the law. Hence in my operations the preferred purifiers produce negative deviations from Raoult's Law, as previously mentioned, and have relatively low molecular weights, not above 50, whereby low weight concentrations, as shown for water in the foregoing, suffice to produce large depression of the lactam freezing point.

Because of its economy and because it has particularly good characteristics for my freezing operations as brought out in the foregoing and hereinafter, water is the purifier of choice for incorporation into molten lactam to be worked up according to my invention.

Any soluble contaminants in a lactam feed will lower the freezing point of the lactam, more or less according to the foregoing table on the basis of their molality. The quantity of purifier, e. g. water, to be incorporated into the lactam melt for partial freezing by my process will therefore vary with the purity of the lactam and in general will be greater the purer the starting lactam, i. e., the higher its freezing point. For efficiency and economy in multistage purification processes such as described below, I prefer to use fresh lactam having melting point, when anhydrous, not substantially below about 45° C., and more preferably not below about 65° C., for making up first stage feed mixtures.

My process can be operated either by chilling molten lactam containing purifier, thereby freezing a portion of the lactam from the melt; or by reducing the purifier concentration in a melt which is at or near its freezing point, e. g. by extraction or evaporation of purifier, thereby inducing solidification of lactam consequent upon the system tending toward equilibrium between solid lactam and lactam in the melt; or by a combination of these methods.

Temperature control can be used to control the progress of such operations, providing there is a reasonably wide temperature difference between the freezing point of pure lactam (68° C.) and that of lactam in the melt finally to be formed. A minimum difference for practical purposes is about 3° C., corresponding to a melt with molality of purifier about 0.5. Where the final slush contains 80% solids this 0.5 molality of purifier in the melt corresponds to about 0.1 molality of purifier incorporated in the original lactam being processed.

A wide range of operating temperatures can be used, the ultimate maximum being the freezing point of pure lactam (about 68° C.) and the ultimate minimum being the eutectic of the particular melt. The molality of purifier in the final melt will not exceed the eutectic value. This value depends on the particular choice of purifier; for water it is about 30 molal (reached at about 35 weight percent water in the melt). Because my process depends upon the solvent power of lactam for removal of impurities, the final melt should always contain a substantial proportion of lactam. The figure of 30 molal for purifier concentration in the final melt represents a maximum value to insure adequate solubility of impurities in the final melt.

To maintain effective retention of organic contaminants in the melt together with desirable operating latitude and process economy I prefer to partially freeze until there is obtained a lactam rich melt having purifier molality not in excess of about 20 molal with respect to the epsilon-caprolactam in the melt, more preferably not above 10 molal nor below about 3.5 molal. With water as the purifier these values correspond approximately to freezing points of the final melt of 0° C., and 25–50° C.

Although under some circumstances slushes of lactam with up to about 80% by weight solid lactam can be produced and further processed in accordance with my invention, for best handling characteristics consistent with production of high quality crystal crops the slush formed in the freezing step should not be substantially in excess of 60% by weight solids (lactam crystals). Preferably the solids contents of this slush is from about 30 to 60 percent, as previously mentioned. Initial concentration of purifier in the molten lactam will depend upon the desired solids concentration of the final slush, the temperature desired for the final melt, and the amount of purifier which is to be evaporated, when an evaporative process is employed. For instance when a final slush with 40% by weight solid lactam is desired, and a final temperature of 40° C., and water is the purifier, the initial solution of purifier in lactam will be about 4.3 molal, and about 1 mol of water per mol of lactam in the initial melt will be evaporated during processing, with temperature lowered from 45° to 40° C.

Evaporative freezing methods are preferred because I have found these methods overcome the problem of the lactam crystals sticking to surfaces with which they come into contact. Probably this favorable behavior is due to crystal formation occurring throughout the melt rather than principally at surfaces where the melt is being cooled. Conventional evaporating equipment can be used with very little adaptation. High quality easily handled crystals of lactam can be formed at a very high rate by my process, preferred rates being at least two, and best about five pounds per hour per cubic foot of freezing vessel volume whereby desirable crystal sizes are assured, namely 10–100 U. S. standard mesh. Practical vapor removal rates are as high as 10 pounds per hour per cubic foot of freezing vessel volume, providing liquid entrainment is substantially prevented by use of an evaporating vessel having sufficient diameter.

There are a variety of thermodynamic paths I can use to obtain the degree of partial freezing desired in the preferred evaporative freezing with water as purifier. For instance it is economical of heat to use, neglecting ambient temperature effects which on large scale operations are minute, substantially adiabatic evaporation; that is, concentrating and removing sensible heat of the solution and heat of crystallization of lactam by evaporation of water with only such incidental addition of heat as may be necessary to adjust the final temperature of the slush obtained into the particular range desired in the event that such range is overshot.

Agitation supplementing ebullition during evaporation is advantageous to obtain individual crystal sizes of narrow desirable size range, e. g. passing through 14 (1.41 mm.) and retained on 50 (.30 mm.) mesh U. S. standard screen sizes. Accordingly I prefer to supplement agitation from ebullition during the partial freezing step by stirring, circulating through a pump, etc.

Lactam crystals in the slush can be separated therefrom by conventional means such as filters or centrifuges. Centrifugal separation is preferred since the lactam-rich melt adhering to the crystals can be reduced very rapidly to a value of as little as 5 weight percent based on the weight of the wet crystal crop, and the amount of rinse used to displace the adhering melt effectively can be then quite small, e. g. about 30% of the weight of the crop.

Rinsing the separated crystals is best done with a solution of volatile material in molten pure lactam, e. g. with a solution having about the same temperature and composition, except for non-volatile impurities, as the lactam-rich melt from which the crystal crop was separated, so as to prevent washing away of or partial fusion of the crop.

Under the preferred conditions outlined herein, reduction of impurities in a lactam feed can be by as much as about 40-fold per purification stage. Since a small amount of lactam-rich melt containing contaminants will adhere to the lactam crystals separated in a particular stage, I prefer to use at least three consecutive purification stages to constitute one lactam purification cycle and thereby, by successive displacement, remove virtually all organic contaminants from the final output lactam.

To maintain the most consistent operation of my multistage cyclic process, I prefer to remove from the first purification stage as purge a portion of the lactam-rich melt containing contaminants in amount approximately equivalent to the amount of contaminants being introduced in the impure lactam fed to the purification system, and to reprocess the balance of said melt in the first stage of a subsequent purification cycle. Rather than returning the melt from a later stage in its entirety to the first stage of a subsequent cycle I utilize part of it for admixture with incoming crystals at the same stage in a subsequent cycle, to provide part of the desired quantity of melt for operating said later stage.

Using a typical crude desalted lactam from Beckmann rearrangement having about ½ by weight organic contaminants based on the weight of lactam, I reserve about 80% of the lactam-rich melt obtained from each separation step of a purification stage for reuse in the corresponding purification stage of a subsequent cycle. The remainder from the first stage of a cycle is purged to a recovery stage; from a later stage it is reserved for rinsing the lactam crystals separated in the immediately previous stage of a subsequent cycle.

Economy in my process is improved by a recovery stage operated on the purged melt. Suitably about the same conditions are used as in the principal purification stages. In such recovery stage I blend the purged melt with melt reserved from a previous recovery stage crystal separation and with make-up purifier; then I partially freeze the blended material and separate crystalline lactam from the resulting melt. Part of the melt separated is reserved for feedback to the recovery stage of a subsequent cycle and the balance is withdrawn as an impurities concentrate containing lactam in amount of about 1% of the fresh lactam being fed to a purification cycle. The resulting recovered crystalline lactam is admixed with the impure lactam entering the first stage of a subsequent purification cycle.

My purification process can be applied to distilled epsilon-caprolactam products; it is also applicable with advantage directly to crude lactam e. g. the lactam layer obtained by Beckmann rearrangement; lactam obtained from reduction and rearrangement of nitrocyclohexane containing cyclohexanone as the chief impurity; etc.

To separate inorganic salt from lactam, one can distill off lactam and leave a salt cake. I have found, however, that it is unnecessary to do this at least with lactam from Beckmann rearrangement reaction mixtures containing ammonimum sulfate as the inorganic neutralization product. Instead I evaporate water, suitably under reduced pressure, from the crude lactam layer containing, for example, about one pound of ammonium sulfate per 100 pounds of lactam and leave molten lactam containing no more than about 10 pounds and preferably about 5 pounds of water per 100 pounds of lactam. The salt is for all practical purposes insoluble in the melt. The salt can then be removed by filtering or centrifuging. I prefer to use temperature of about 75° to 80° C. and absolute pressure of about 75 mm. Hg for water evaporation in my desalting procedure. The water remaining in the lactam furnishes purifier for my freezing process.

Where possible recontamination of the product may occur from contact with metal surfaces and especially in the later purification stages, the preferred material for construction of all vessels, piping, pumps, and centrifuges is an austenitic stainless steel such as American Iron and Steel Institute standard types 316 and 304. I have found that it is advantageous for reducing corrosion to incorporate sufficient ammonia with the materials handled to maintain neutral or alkaline conditions (pH of 7 or above). The added ammonia functions as a purifier.

The following examples show several ways in which my invention can be practiced but are not to be construed as limiting it. All parts are weight parts and all percentages are weight percentages unless otherwise stated.

*Example 1.*—1000 parts by weight of impure dry lactam product of Beckmann rearrangement was melted to form a homogeneous solution with 100 parts (5.55 mols) of water by heating to 60° C. with agitation in a "Pyrex" glass vessel. The melt was about 5.6 molal in purifier (water and organic contaminants). The melt was then partially frozen by cooling it to a temperature of 25° C. under agitation using a cooling jacket around the vessel. There resulted a slush of crystalline lactam and lactam-rich melt the solids content of the slush being about 45%. Purifier (water and organic contaminants) concentration in the final melt was about 10 molal with respect to the epsilon-caprolactam in the melt. The overall molal depression of the freezing point in the final melt accordingly was about 4.3.

Lactam crystals were separated from the slush by means of a centrifuge and rinsed with 180 parts of aqueous pure lactam containing 16% water. The resulting crystals containing 0.4% water had color of 20 A. P. H. A. units and permanganate number of 360 seconds as measured by the testing procedures described above, i. e. they were highly purified.

*Example 2.*—55 parts by weight of lactam having analysis by weight of 95.5% epsilon-caprolactam, 0.5% water, and remainder (4%) organic contaminants was liquefied to form a homogeneous solution with 5 parts (0.28 mol) of additional water and 54 parts of lactam containing 16% water, by heating the mixture to 43° C. with agitation in a stainless steel 304 vessel. The solution was about 6–7 molal in purifier (water and organic contaminants) with respect to epsilon-caprolactam. The solution was then partially frozen while being agitated by evaporating off water and any organic substances volatilizing therewith at from 50 to 15 mm. Hg absolute pressure until temperature of 21° C. was attained. There resulted a slush of crystalline lactam and lactam-rich melt, said slush having about 48% by weight solids content. Purifier (water and organic contaminants) concentration in the final melt was about 11 molal with respect to the epsilon-caprolactam in the melt. The overall molal depression of the freezing point in the final melt accordingly was about 4.3.

Lactam crystals were separated from the slush by means of a centrifuge capable of imparting 600 times the gravitational acceleration; and were rinsed with 12 parts of aqueous pure lactam from a previous batch containing 16% water. The rinsed crystals had color of 25 A. P. H. A. units and permanganate number of 259 seconds as measured by the test procedures described above; hence were highly purified. The melt centrifuged off had color of 68 A. P. H. A. units.

*Example 3.*—500 parts by weight of impure lactam was melted to form a homogeneous melt with 240 parts of cyclohexanone by heating to 50° C. The melt had a color of 160 A. P. H. A. units. The melt was about 5 molal in purifier (cyclohexanone and impurities). The melt was then partially frozen with agitation by cooling it to 28° C. in a "Pyrex" glass vessel surrounded by a cooling jacket. There resulted a slush of crystalline lactam and a lactam-rich melt, the solids content of the slush being about 46%. Cyclohexanone and impurities in the final melt were about 17 molal. The overall molal depression of the freezing point in the final melt accordingly was about 2.3.

Crystals were separated from the melt by centrifuging. There resulted 321 parts of wet crystals with a color of 50 A. P. H. A. units and 378 parts of melt with a color of 200 A. P. H. A. units.

The following example illustrates the operation of one purification cycle in a series of cycles run repetitively in essentially the same way each time. The cycle consists of three consecutive purification stages and a recovery stage as depicted in the accompanying drawing. Process flows and equipment are numbered in the description to correspond to the numerals in the drawing. The lactam is the product made by Beckmann rearrangement of cyclohexanone oxime in sulfuric acid medium. Such Beckmann rearrangement reaction mixture to which water has been added in amount to form a saturated aqueous solution of inorganic salt upon neutralization separates, when neutralized, into two layers. The major portion of the lactam product goes into the lactam layer. Additional lactam product is obtainable from the aqueous brine e. g. by extraction.

*Example 4.—Preparation of feed.*—Evaporator 18 is charged with 4595 parts by weight of crude lactam 19 from Beckmann rearrangement. The crude lactam has pH at least 7 and has composition as follows: 68.0% epsilon-caprolactam, 30.4% water, 0.6% organic contaminants, and 1.0% ammonium sulfate. Vapor 20, amounting to 1305 parts, about 95% water and 5% lactam, is evaporated from the crude lactam under total pressure of 75 mm. Hg absolute and temperature of 76° C. Ammonia is added if needed to give the resulting melt a pH of at least 7, since this condition is necessary to render ammonium sulfate substantially insoluble in the aqueous lactam melt.

Aqueous lactam melt 21 remaining after evaporation, 3290 parts, containing suspended salt and 4.86% water, is withdrawn from the evaporator 18 and separated in centrifuge 22 into salt cake 23 and 3241 parts of desalted molten lactam 24 of approximate composition 94.3% lactam, 4.9% water, and 0.8% organic contaminants, with no inorganic salt. The desalted lactam contains 3056 parts of lactam, 160 parts of water, and 25 parts of organic contaminants.

Desalting can also be accomplished by flash vaporizing the lactam product of Beckmann rearrangement. Desalted lactam 24, when anhydrous, has melting point of 67.6° C.

Operation of the first purification stage

The heart of my process is the freezing operation. This is essentially the same in all stages of my preferred process. Preferably, then, molten lactam containing volatile purifier, e. g. about 9–10% by weight of dissolved water, is pumped into a vacuum crystallizer apparatus; and is circulated therein by pumping through an external unit in which the desired temperature is imparted. The operating pressures are sufficiently low to boil volatile purifier from the lactam melt at its freezing point, e. g. at about 40° C., or the purifier is entrained in a stream of inert gas. Thus when 9–10% water is the purifier, the pressures used during the partial evaporative freezing operation of my process are suitably about 20–25 mm. of mercury absolute. As the water evaporates, the melt becomes richer in the less volatile components including the lactam, whence the freezing point in the melt rises; in consequence when the melt temperature is maintained constant, solidification of pure lactam will continue spontaneously and without further evaporation of water until the original molality of the melt with respect to lactam is restored. The solidification will stop sooner if the melt temperature rises and will continue longer if the melt temperature drops.

In an aqueous lactam melt containing 9–10% water, the cooling effect accompanying the vaporization of water therefrom exceeds the heat given out by the consequent lactam solidification, so that a net input of heat, roughly half the heat of vaporization of the water removed, is required to maintain the temperature in said melt constant at the original freezing point.

Typical operating details are shown in the following. In all freezing operations below, water is vaporized from melt at a rate of about 0.5 pound per hour per cubic foot, producing 5 pounds of crystals in the melt per cubic foot.

The desalted molten lactam 24, 3241 parts, is piped to tank 26 wherein it is blended at 40° C. with (a) 975 parts of wet crystals 77 produced in a previous cycle from purge, as hereinafter described, and with (b) 260 parts of water in aqueous condensate 1, typically consisting of 97.5% water and 2.5% lactam collected in storage tank 3 as below described. Its approximate composition is 89.6% lactam, 9.4% water, and 1.0% organic contaminants. The blended material forms first stage feed mixture 29. Three parts of ammonia 2 are added to tank 26, this amount being sufficient to maintain the materials handled in tank 26 and freezer 32 at pH between 7 and 8.5.

Feed mixture 29 amounting to 4479 parts, is then pumped into freezer 32 wherein it is mixed with 6427 parts of feedback 33 pumped from tank 38, said feedback consisting of 5131 parts of the first stage melt of a previous cycle corresponding to melt 37 described below; together with 1296 parts of rinsings 40 used to displace said melt during solids recovery in a previous cycle operated as hereinafter described. Feedback 33 has approximate composition 87.5% lactam, 8.5% water, and 4% organic contaminants. The resulting aqueous molten lactam for first stage freezing has a temperature of 40° C. and approximate composition, exclusive of ammonia to maintain alkalinity, of 88.2% lactam, 9.0% water, and 2.8% organic contaminants. It amounts to 10,903 parts.

The molality in water with respect to lactam is about 5.65.

This aqueous molten lactam is then partially frozen and evaporated at 40° C. as above described and forms 10,474 parts of slush 34 consisting of 3969 parts of crystalline lactam solids and the remainder a melt 37 containing 5647 parts of lactam, 558 parts of water and 300 parts of organic contaminants and having molality of water with respect to the epsilon-caprolactam in said melt of about 5.5. The evaporation operation removes 419 parts of water and 10 parts of lactam as vapor 35.

Water and lactam in vapor 35 are condensed. The aqueous condensate containing 97.5% water and 2.5% lactam is reserved in tank 3 e. g. for use as purifier in subsequent operations.

Slush 34, amounting to 10,474 parts, is pumped from freezer 32 to centrifuge 36 wherein it is separated into wet lactam crystals and melt 37. Melt 37 amounting to 6263 parts, is piped to tank 38 wherein 5131 parts are reserved as one component of feedback 33 for the first stage of a subsequent cycle. The remainder of melt 37, amounting to 1132 parts, is withdrawn as purged melt 39 for recovery processing hereinafter described. Melt 37 has approximate composition 86.8% lactam, 8.6% water, and 4.6% organic contaminants.

The separated wet lactam crystals are rinsed in centrifuge 36 with 1296 parts of rinse 40 drawn from tank 52 which is maintained at temperature of 40° C. Rinse 40 consists of melt, corresponding to melt 51 described below, from the second stage separation in a previous cycle operated as hereinafter described. The spent rinse, 1296 parts, is piped to tank 38 for making up the first stage feedback of a subsequent cycle. Rinsed lactam crystals 41, amounting to 4211 parts, are withdrawn from centrifuge 36. They contain 4185 parts of solid and molten lactam, 21 parts of water, and 5 parts of organic contaminants corresponding to 99.4% lactam—0.5% water—0.1% balance.

Operation of the second stage

The rinsed lactam crystals 41, amounting to 4211 parts, are conveyed to agitator tank 42. Therein they are melted under agitation by heating at temperature 40° C. with (a) 418 parts of water in aqueous condensate 43 from collecting tank 3 typically consisting of 97.5% water and 2.5% lactam; and (b) 1297 parts of spent rinse 44 said rinse being obtained from the second stage separation of a previous cycle operated as hereinafter described. The aqueous molten lactam thus formed is second stage feed mixture 45. Ammonia in small quantities, e. g. 3 parts, can be incorporated in mixture 45 to maintain it at pH between 7 and 8.5. This feed has approximate composition, exclusive of any ammonia of 90.6% lactam, 9.3% water and 0.1% organic contaminants.

Molten lactam 45, filtered to remove any particles of rust, weld spatter and other foreign matter is pumped into freezer 46 wherein it is mixed with 4466 parts of feedback 47 pumped from tank 52. Feedback 47 consists of melt corresponding to melt 51 described below, reserved from the second stage separation in a previous cycle operated as described below. Together, flows 45 and 47 form aqueous molten lactam for second stage freezing having temperature of 40° C. and approximate composition, exclusive of ammonia, of 90.6% lactam, 9.2% water, and 0.2% organic contaminants, amounting to 10,392 parts. The molality of water with respect to lactam in this aqueous molten lactam is about 5.7.

This aqueous molten lactam is then partially frozen and evaporated at 40° C. as previously described and forms 9964 parts of slush 48 consisting of 3969 parts of crystalline lactam solids, and the remainder a melt 51 containing 5431 parts of lactam, 541 parts of water, and 23 parts of organic contaminants. The molality of water with respect to the epsilon-caprolactam in said melt is about 5.5.

The evaporation operation removes 418 parts of water and 10 parts of lactam as vapor 49 at total pressure of 21 mm. Hg absolute and temperature of 40° C. Water and lactam in the vapor 49 are condensed. The aqueous condensate containing 97.5% water and 2.5% lactam is reserved in tank 3 e. g. for use as purifier in subsequent operations.

Slush 48, amounting to 9964 parts, is pumped from freezer 46 to centrifuge 50 wherein it is separated into wet lactam crystals and melt 51. Melt 51, amounting to 5762 parts, is piped to tank 52 wherein 4466 parts are reserved for feedback 47 to the second stage of a subsequent cycle, and 1296 parts are reserved for rinse 40 for lactam crystals in the first stage separation of a subsequent cycle. The approximate composition of melt 51 is 90.5% lactam, 9.1% water and 0.4% organic contaminants.

The separated wet lactam crystals are rinsed in centrifuge 50 with 1296 parts of rinse 53 drawn from tank 65 which is maintained at temperature of 40° C. Rinse 53 consists of melt, corresponding to melt 64 described below, from the third stage separation in a previous cycle operated as hereinafter described. Spent rinse amounting to 1297 parts is piped as component 44 of the second stage feed mixture in a subsequent cycle. Rinsed lactam crystals 54, amounting to 4201 parts, are withdrawn from centrifuge 50 for use in the third stage of the cycle. They contain 4180 parts of solid and molten lactam, 21 parts of water, and 0.5 part of organic contaminants corresponding to 99.50% lactam, 0.49% water and 0.01% organic contaminants.

*Operation of the third stage*

Equipment of the third purification stage is made of austenitic stainless steel. The rinsed lactam crystals 54, amounting to 4201 parts, are conveyed to agitator tank 55. Therein they are melted under agitation by heating at temperature of 40° C. with (*a*) 417 parts of water in aqueous condensate 56 from collecting tank 3, typically consisting of 97.5% water and 2.5% lactam; and (*b*) 1296 parts of spent rinse 57, said rinse being obtained from the third stage separation of a previous cycle operated as hereinafter described. The feed 58 thus formed has approximate composition of 90.6% lactam, 9.4% water, 85 parts per million organic contaminants.

Feed mixture 58, amounting to 5914 parts, is then pumped into freezer 59 wherein it is mixed with 4378 parts of feedback 60, pumped from tank 65. Feedback 60 consists of melt corresponding to melt 64 described below, reserved from the third stage separation of a previous cycle operated as described below. Together, flows 58 and 60 form aqueous molten lactam for third stage freezing having temperature of 40° C. and approximate composition 90.75% lactam, 9.25% water, and 200 parts per million organic contaminants. Its molality in water with respect to lactam is about 5.7.

This aqueous molten lactam is then partially frozen and evaporated at 40° C. as previously described and forms 9865 parts of slush 61 consisting of 3959 parts of crystalline lactam solids and the remainder a melt 64 containing 5370 parts of lactam, 534 parts of water and 2 parts of organic contaminants. The molality of water with respect to the epsilon-caprolactam in said melt is about 5.5. The evaporation operation removes 417 parts of water and 10 parts of lactam as vapor 62 at total pressure of 21 mm. Hg absolute and temperature of 40° C. Water and lactam in the vapor 62 are condensed. The aqueous condensate containing 97.5% water and 2.5% lactam is reserved in tank 3 e. g. for use as purifier in subsequent operations.

Slush 61, amounting to 9865 parts, is pumped from freezer 59 to centrifuge 63 wherein it is separated into wet lactam crystals and melt 64. Melt 64 amounting to 5674 parts, is piped to tank 65 wherein 4378 parts are reserved for feedback 60 to the third stage of a subsequent cycle; and 1296 parts are reserved for rinse 53 for the wet lactam crystals in the second stage separation of a subsequent cycle. The approximate composition of melt 64 is 91% lactam, 9% water, 350 parts per million organic contaminants.

The separated wet lactam crystals are rinsed in centrifuge 63 with 1296 parts of rinse 66 drawn from tank 70 which is maintained at temperature of 40° C. Rinse 66 is made up as described below from aqueous condensate from tank 3 and portion 69 of the third stage rinsed lactam crystal product of a previous cycle. The spent rinse, amounting to 1296 parts, is piped to tank 55 as component 57 of the third stage feed mixture in a subsequent cycle.

Rinsed lactam crystals 67, amounting to 4191 parts, are withdrawn from centrifuge 63 and divided into two portions. Portion 69 is 1185 parts. The portion 69 is conveyed to tank 70 wherein it is melted and mixed at 40° C. with 111 parts of water in aqueous condensate 71 from collecting tank 3, typically consisting of 97.5% water and 2.5% lactam. The resulting molten lactam is reserved as rinse 66 for rinsing the wet lactam crystals separated in the third stage of a subsequent cycle. Portion 68 is the purified epsilon-caprolactam crystal output of the cycle, consisting of 2991 parts of lactam and 15 parts water. Its quality is described hereinafter. This product can be dried if the adhering water is undesirable.

*Operation of the recovery stage*

Equipment of the recovery stage, with the exception of centrifuge 76, can be made of carbon steel. Purged melt 39 from the first stage, 1132 parts, with about 1 part of ammonia incorporated to maintain the materials handled in freezer 73 at pH between 7 and 8.5, is pumped to freezer 73 wherein it is mixed with 1308 parts of feedback 72, a portion of melt 78 separated in centrifuge 76 from slush formed in the recovery stage of the next preceding cycle, operated as described below. Together the feed and feedback in freezer 73 form aqueous molten lactam for recovery stage freezing having temperature of 40° C. and approximate composition, exclusive of ammonia, of 69% lactam, 5.6% water, and 25.4% organic contaminants. The molality of water in this molten lactam, with respect to the lactam therein, is about 4.5; the organic contaminant adds to the effect of the water in lowering the freezing point.

This aqueous molten lactam is partially frozen and evaporated at 40° C. as previously described and forms slush 74, amounting to 2340 parts consisting of 929 parts by weight of crystalline lactam solids, the remainder a melt having molality of water with respect to the epsilon-caprolactam in said melt of about 3 and approximate composition 53% lactam, 3% water, 44% organic contaminants. The evaporation operation removes about 95 parts of water and 2 parts of lactam as vapor 75 at 21 mm. Hg absolute and temperature of 40° C. Water and lactam in vapor 75 are condensed. The aqueous condensate is reserved in tank 3, e. g. for use as purifier in subsequent operations.

Slush 74, amounting to 2340 parts, is withdrawn from freezer 73 and separated in centrifuge 76 into wet recovered lactam crystals 77 amounting to 975 parts, and melt 78 amounting to 1365 parts. Recovered lactam crystals 77 are conveyed to agitator tank 26 wherein they are melted and mixed at 40° C. with desalted molten lactam and condensate to form first stage feed mixture 29 for a subsequent cycle. The approximate composition of crystals 77 is 97.8% lactam, 0.15% water, 2.05% organic contaminants.

Melt 78 is divided into two portions, 1308 parts being used as feedback 72 for the recovery stage of the next cycle. The remainder, 57 parts, is withdrawn from the system as impurities concentrate 80 having the composition of the melt, i. e. 53% lactam, 3% water, 44% of organic contaminants. It contains 30 parts of lactam, i. e. about 1% of the entering lactam.

The product of the cycle

Of the total lactam content in the desalted neutralized crude lactam 24 charged to the cycle, about 98% is recovered as purified epsilon-caprolactam product 68 of high quality. Another 1% is recoverable from the condensate in tank 3, and 1% goes out in the purge (recoverable).

Crystal size distribution of the product as measured by U. S. standard screen sizes is as follows: 1.8% on 10 mesh; 1.9% on 14 mesh; 48.3% on 20 mesh; 43.6% on 50 mesh; 4.4% on 100 mesh. Such crystals are easily handled, e. g. in conveyors, hoppers, etc.

Aqueous solutions of a representative sample of these crystals, tested according to the procedures hereinbefore described, show the lactam produced to have permanganate number of 480 seconds and color corresponding to only 25 A. P. H. A. units.

A portion of the sample, when dried for 4 hours at 60° C. is white; has melting point (uncorrected) of 68.0° C.; has iron content less than 10 parts per million; is neutral; is practically free from volatile materials; and forms clear solutions with water.

The product is eminently suitable for polymerization.

Example 4 has shown handling the slush of crystalline lactam and lactam melt by means of pipes, pumps, etc. Other means can be used and are sometimes desirable e. g. for a slush having very high solids content. Such means are, for example, screw conveyors, etc. Additional purification stages similar to the second stage of Example 4 can be used. Considerable variations in the operating details specifically described for my cyclic multistage process are permissible within the broad scope of my preferred process; important features thereof are that melt be used as feedback in a particular purification stage, which can be drawn from any purification stage, no earlier than that now being considered, in a previous cycle; and that in a recovery stage, purged melt formed in the first stage is again partially frozen to form (a) lactam crystals supplied to the first stage of a subsequent cycle and (b) an impurities concentrate which is withdrawn. In this way a pure lactam can be produced and the impurities can be highly concentrated in the purge without need of producing slurries with solids content above 60% by weight. Moreover it is advantageous, for obtaining a pure lactam product in good yield, to use as rinse an aqueous molten lactam of like molality in purifier to the melt being displaced but with lower concentration of organic contaminants, e. g. melt or spent rinse from a subsequent stage in a previous cycle, operating at the same final temperature as the given stage.

My process is especially suitable for final purification of lactam, e. g. purification of lactam having less than 1 part of organic contaminants per 100 parts of lactam. By my process such lactam can readily be purified to impurities content well under 100 parts per million.

The heat of fusion of epsilon-caprolactam is about 4000 calories per mol. Accordingly the overall molal freezing point depression in a given ideal solution of purifier in molten epsilon-caprolactam can be calculated from the equation:

$$T_0 - T = \frac{-RTT_0}{H}(\ln X)$$

where $T_0$ is the freezing point of pure lactam (341° K.), T is the freezing point in °K. which will be observed at purifier mol fraction of X, R=2 is the gas constant per mol, H is the heat of fusion of epsilon-caprolactam per mol (4000 calories); and X is the mol fraction of purifier. The resulting figure is about 3 centigrade degrees per mol when the melt is 17 molal in purifier as is the final melt in Example 3 above; and is about 4 centigrade degrees per mol at 10 molal and about 5 centigrade degrees per mol when the melt is 3.5 molal in purifier, a preferred minimum.

Caprolactam which goes out in the purge from my process can be largely recovered in form suitable for feed to my process, e. g. by flash distillation.

I claim:

1. A process for purifying epsilon-caprolactam which comprises partially freezing molten epsilon-caprolactam, containing dissolved therein as freezing point depressor at least 0.1 gram mol of at least one lactam-soluble material per 1000 grams of epsilon-caprolactam, into a slush of crystalline lactam and melt, said melt having concentration of said lactam-soluble material not in excess of about 30 molal with respect to the epsilon-caprolactam therein; and separating crystalline lactam from said melt.

2. The process defined in claim 1 wherein the freezing point depressor effects molal depression of the caprolactam freezing point of at least about 2° C. per mol and the solids content of said slush is in the range between about 20% and about 80% lactam by weight.

3. The process defined in claim 2 wherein a volatile freezing point depressor is dissolved in the molten lactam.

4. The process defined in claim 3 wherein the freezing point depressor produces only negative deviation from Raoult's Law when dissolved in epsilon caprolactam, and the overall molal lowering of the caprolactam freezing point is maintained at least at about 4 centigrade degrees per mol.

5. The process defined in claim 4 wherein water is employed as a freezing point depressor; partial freezing is accomplished by evaporating water from said molten lactam while maintaining temperatures of the melt in the range between about 65° C. and about 0° C.; and the final slush has solids content in the range between about 30% and about 60% lactam by weight.

6. A cyclic process for purifying epsilon-caprolactam comprising more than one purification stage, each purification stage after the first including: partially freezing molten epsilon-caprolactam containing dissolved therein as freezing point depressor at least 0.1 gram mol of epsilon-caprolactam-soluble material per 1000 grams of lactam which depressor effects molal depression of the caprolactam freezing point of at least about 2° C., part of said molten caprolactam being melt from a stage in a previous cycle no earlier than the stage now considered and part being crystals from an earlier stage in the cycle, and thus forming a slush consisting of 30–60% by weight crystalline lactam and melt, said melt having freezing point depressor concentration not in excess of about 30 molal with respect to the epsilon-caprolactam therein; and separating crystalline lactam from said slush; and the first purification stage including: partially freezing molten epsilon-caprolactam containing dissolved therein as freezing point depressor at least 0.1 gram mol of epsilon-caprolactam-soluble material per 1000 grams of lactam, and thus forming a slush of 30–60% by weight crystalline lactam and melt, said melt having freezing point depressor concentration not in excess of about 30 molal with respect to epsilon-caprolactam therein; separating and forwarding crystals thus formed to a subsequent purification stage; and in a recovery stage again partially freezing melt formed in at least the first purification stage to form lactam crystals which are supplied to the first purification stage of a subsequent cycle and an impurities concentrate which is withdrawn.

7. The process defined in claim 6 wherein the fresh caprolactam used for making up the first stage feed mixture has melting point, when anhydrous, not below about 65° C. and in all stages the following conditions are employed: water is employed as a freezing point depressor; partial freezing is accomplished by evaporating water from said molten lactam while maintaining temperatures of the melt in the range between about 65° C. and about 0° C.; the final slush has solids content in the range between about 30% and about 60% lactam by weight; the final melt has molality of water with respect to caprolactam in the melt not in excess of about 20 molal; and water is vaporized from the melt at a rate which produces lactam crystals in the melt at a rate of at least 2 pounds per hour per cubic foot.

8. The process defined in claim 7 wherein the fresh lactam entering the first purification stage of a cycle is a lactam product made by Beckmann rearrangement of cyclohexanone oxime with sulfuric acid; and in all purification stages temperature during final evaporation of water is maintained at about 40° C. and the slush obtained has about 40% by weight crystalline lactam content.

9. The process defined in claim 8 wherein fresh lactam for feeding to the first stage of a cycle is desalted by evaporating water therefrom under reduced pressure until the water:lactam weight ratio is no greater than 1:10 in the liquor remaining, and separating the precipitated salt from said liquor remaining; and ammonia is added in amounts to maintain pH of at least 7 in all stages.

References Cited in the file of this patent
UNITED STATES PATENTS

| | | |
|---|---|---|
| 2,201,200 | Pinkney | May 21, 1940 |
| 2,351,381 | Wiest | June 13, 1944 |
| 2,351,939 | Drossbach | June 20, 1944 |
| 2,462,009 | Morris et al. | Feb. 15, 1949 |
| 2,688,014 | Wirth | Aug. 31, 1954 |
| 2,692,878 | Kahr | Oct. 26, 1954 |

FOREIGN PATENTS

| | | |
|---|---|---|
| 1,062,598 | France | Dec. 9, 1953 |
| 527,317 | Great Britain | Oct. 7, 1940 |
| 583,947 | Great Britain | Jan. 3, 1947 |
| 666,717 | Great Britain | Feb. 20, 1952 |

OTHER REFERENCES

MacArdle: "Solvents in Synthetic Org. Chem.," pp. 12–17, 21–22 (1925, Van Nostrand).

U. S. DEPARTMENT OF COMMERCE
PATENT OFFICE

CERTIFICATE OF CORRECTION

Patent No. 2,813,858            November 19, 1957

George G. Joris

It is hereby certified that error appears in the printed specification of the above numbered patent requiring correction and that the said Letters Patent should read as corrected below.

Column 2, line 5, for "tsandard" read -- standard --; column 3, line 51, for "part of" read -- part or --; column 6, line 64, for "1/2" read -- 1/2% --; column 7, line 24, for "ammonimum" read -- ammonium --.

Signed and sealed this 15th day of April 1958.

(SEAL)
Attest:

KARL H. AXLINE
Attesting Officer

ROBERT C. WATSON
Commissioner of Patents